(12) United States Patent
Kurosawa

(10) Patent No.: US 12,534,883 B2
(45) Date of Patent: Jan. 27, 2026

(54) INFORMATION SHARING BETWEEN CONSTRUCTION MACHINES

(71) Applicant: SUMITOMO CONSTRUCTION MACHINERY CO., LTD., Tokyo (JP)

(72) Inventor: Ryota Kurosawa, Chiba (JP)

(73) Assignee: SUMITOMO CONSTRUCTION MACHINERY CO., LTD., Tokyo (JP)

( * ) Notice: Subject to any disclaimer, the term of this patent is extended or adjusted under 35 U.S.C. 154(b) by 850 days.

(21) Appl. No.: 17/448,396

(22) Filed: Sep. 22, 2021

(65) Prior Publication Data

US 2022/0002978 A1    Jan. 6, 2022

Related U.S. Application Data

(63) Continuation of application No. PCT/JP2020/014204, filed on Mar. 27, 2020.

(30) Foreign Application Priority Data

Mar. 27, 2019   (JP) .................. 2019-061771

(51) Int. Cl.
| | |
|---|---|
| *E02F 9/26* | (2006.01) |
| *E02F 9/20* | (2006.01) |
| *E02F 9/24* | (2006.01) |
| *G05D 1/00* | (2006.01) |
| *G06V 20/13* | (2022.01) |
| *G06V 20/58* | (2022.01) |

(52) U.S. Cl.
CPC ............ *E02F 9/261* (2013.01); *E02F 9/20* (2013.01); *E02F 9/24* (2013.01); *G05D 1/0022* (2013.01); *G06V 20/13* (2022.01); *G06V 20/58* (2022.01)

(58) Field of Classification Search
None
See application file for complete search history.

(56) References Cited

U.S. PATENT DOCUMENTS

| | | | |
|---|---|---|---|
| 2002/0059320 A1 | 5/2002 | Tamaru | |
| 2010/0094481 A1* | 4/2010 | Anderson | A01D 34/008 701/1 |
| 2014/0236477 A1* | 8/2014 | Chen | G07C 5/008 701/450 |

(Continued)

FOREIGN PATENT DOCUMENTS

| | | |
|---|---|---|
| EP | 3154024 | 4/2017 |
| JP | 2008-101416 | 5/2008 |

(Continued)

OTHER PUBLICATIONS

Seo; Computer Vision Techniques for Construction Safety and Health Monitoring; Feb. 2015; Advanced Engineering Informatics; 28 (2015) 239-251 (Year: 2015).*

(Continued)

*Primary Examiner* — David P. Merlino
(74) *Attorney, Agent, or Firm* — IPUSA, PLLC

(57) ABSTRACT

A construction machine includes processing circuitry and a transmitter. The processing circuitry is configured to obtain information on a work area in an area surrounding the construction machine. The transmitter is configured to transmit the information obtained by the processing circuitry to another construction machine in the area surrounding the construction machine.

14 Claims, 9 Drawing Sheets

(56) References Cited

U.S. PATENT DOCUMENTS

| | | | |
|---|---|---|---|
| 2017/0342684 A1 | 11/2017 | Sherlock | |
| 2018/0174458 A1* | 6/2018 | Miller | G08G 1/166 |
| 2019/0078294 A1 | 3/2019 | Nagato et al. | |
| 2019/0129690 A1* | 5/2019 | Anderson | H04N 7/181 |
| 2019/0220003 A1* | 7/2019 | Sharma | G01C 21/3841 |
| 2020/0184823 A1* | 6/2020 | Eigel | G01C 21/3815 |
| 2020/0210777 A1* | 7/2020 | Valois | B60W 60/0025 |
| 2020/0327336 A1* | 10/2020 | Seki | E02F 9/26 |
| 2021/0272436 A1* | 9/2021 | Kirchner | H04N 7/188 |
| 2021/0319690 A1* | 10/2021 | Ogawa | G08G 1/0125 |
| 2021/0388578 A1* | 12/2021 | Saito | B60Q 9/008 |

FOREIGN PATENT DOCUMENTS

| | | |
|---|---|---|
| JP | 2012-052380 | 3/2012 |
| JP | 6290497 | 3/2018 |
| WO | 2006/106685 | 10/2006 |
| WO | 2017/208997 | 12/2017 |

OTHER PUBLICATIONS

International Search Report for PCT/JP2020/014204 mailed on Jun. 23, 2020.

* cited by examiner

FIG.9
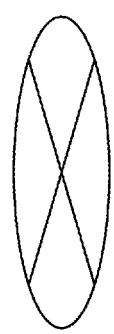
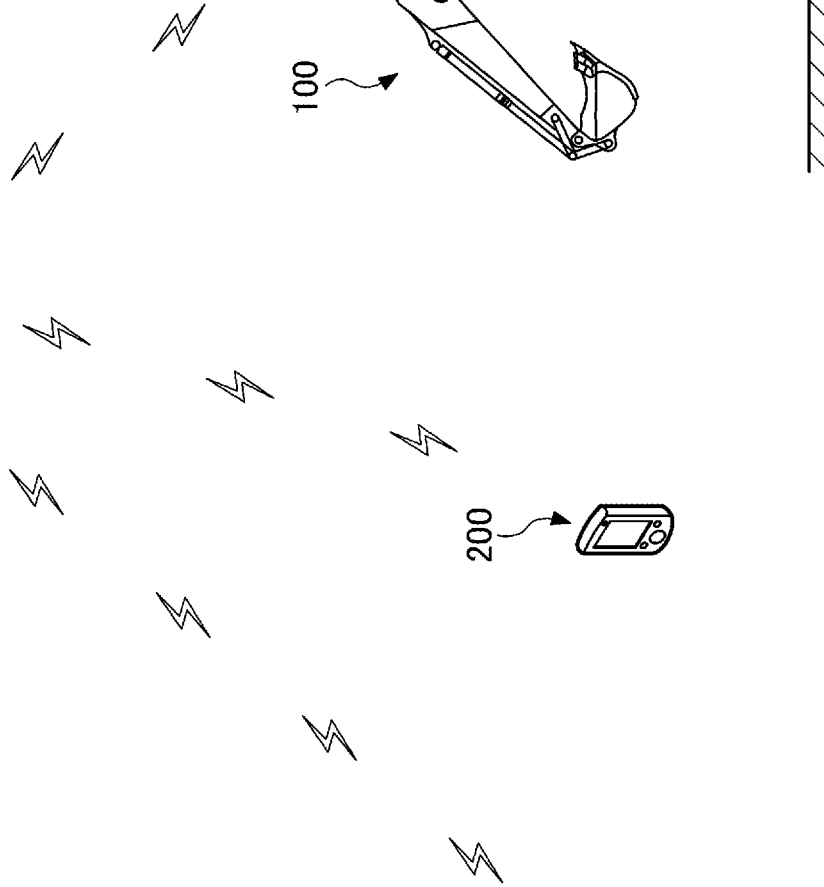
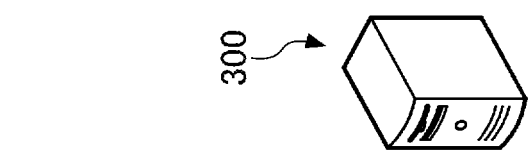

INFORMATION SHARING BETWEEN CONSTRUCTION MACHINES

CROSS-REFERENCE TO RELATED APPLICATIONS

This application is a continuation application filed under 35 U.S.C. 111(a) claiming benefit under 35 U.S.C. 120 and 365(c) of PCT International Application No. PCT/JP2020/014204, filed on Mar. 27, 2020 and designating the U.S., which claims priority to Japanese Patent Application No. 2019-061771, filed on Mar. 27, 2019. The entire contents of the foregoing applications are incorporated herein by reference.

BACKGROUND

Technical Field

The present disclosure relates to construction machines and support systems.

Description of Related Art

A construction machine that obtains useful information on a work area in an area surrounding the construction machine (for example, information on the detection of a monitoring target object such as a worker around) is known.

SUMMARY

According to an embodiment of the present disclosure, a construction machine includes processing circuitry and a transmitter. The processing circuitry is configured to obtain information on a work area in an area surrounding the construction machine. The transmitter is configured to transmit the information obtained by the processing circuitry to another construction machine in the area surrounding the construction machine.

BRIEF DESCRIPTION OF THE DRAWINGS

FIG. 9 is a schematic diagram illustrating another example configuration of the shovel support system.

DETAILED DESCRIPTION

Information on a work area obtained by a construction machine may also be useful for another construction machine that works in the same work area (worksite). Therefore, it is desired that information on a work area in a surrounding area obtained by a construction machine be also available to another construction machine.

Therefore, in view of the above-described issue, a technique that enables information on a work area obtained by a construction machine to be available to another construction machine that works in the same work area is provided.

According to an embodiment of the present disclosure, it is possible to provide a technique that enables information on a work area obtained by a construction machine to be available to another construction machine that works in the same work area.

An embodiment is described below with reference to the drawings.

[Example of Shovel Support System]

An example of a shovel support system SYS according to this embodiment is described with reference to FIGS. 1 through 8.

<Overview of Shovel Support System>

First, the shovel support system SYS according to this example is described with reference to FIG. 1.

Figure 1:
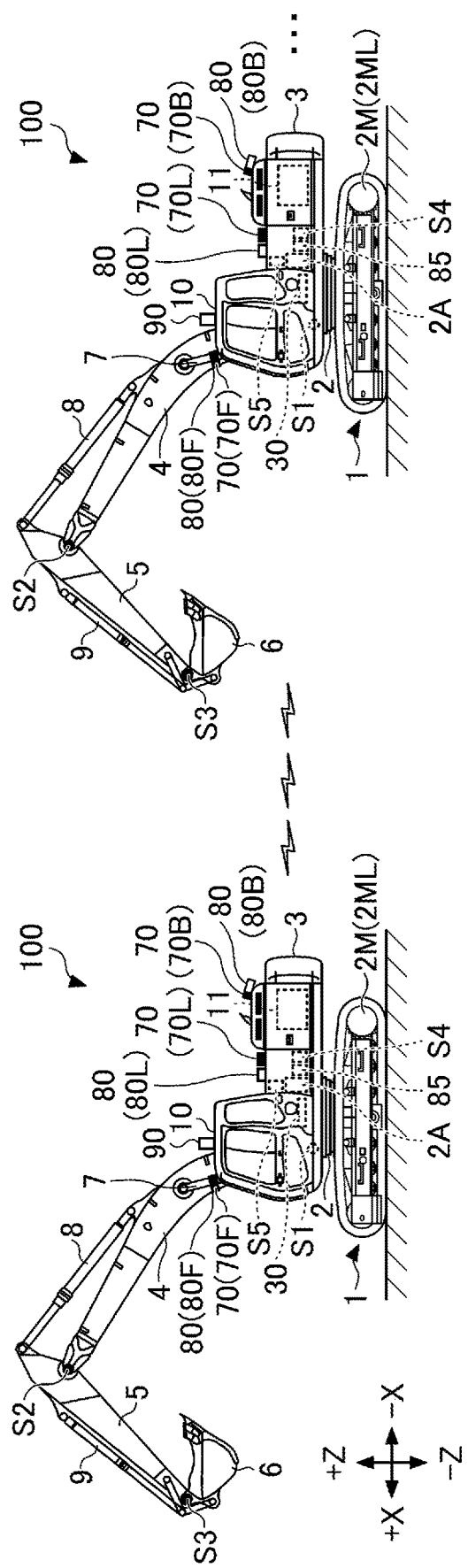
FIG. 1 is a schematic diagram illustrating an example configuration of a shovel support system.

FIG. 1 is a schematic diagram illustrating an example configuration of the shovel support system SYS. The shovel support system SYS includes multiple shovels 100 that are disposed at a relatively short distance from each other (for example, work in the same worksite (work area)), and supports each shovel 100 in performing work. Hereinafter, a description is given based on the assumption that the shovels 100 have the same configuration with respect to the shovel support system SYS.

The shovel 100 (an example of a construction machine) includes a lower traveling structure 1; an upper swing structure 3 swingably mounted on the lower traveling structure 1 via a swing mechanism 2; a boom 4, an arm 5, and a bucket 6 that constitute an attachment; and a cabin 10.

The lower traveling structure 1 includes a pair of left and right crawlers 1C, specifically, a left crawler 1CL and a right crawler 1CR. The lower traveling structure 1 has the left crawler 1CL and the right crawler 1CR hydraulically driven by travel hydraulic motors 2M (2ML, 2MR) to cause the shovel 100 to travel.

The upper swing structure 3 is driven by a swing hydraulic motor 2A to swing relative to the lower traveling structure 1. Furthermore, the upper swing structure 3 may be electrically driven by an electric motor instead of being hydraulically driven by the swing hydraulic motor 2A. Hereinafter, for convenience, the side of the upper swing structure 3 on which the attachment is attached is defined as the front side, and the side of the upper swing structure 3 on which a counterweight is attached is defined as the back side.

The boom 4 is attached to the front center of the upper swing structure 3 to be able to rise and lower. The arm 5 is attached to the distal end of the boom 4 to be able to pivot up and down. The bucket 6 is attached to the distal end of the arm 5 to be able to pivot up and down. The boom 4, the arm 5, and the bucket 6 are hydraulically driven by a boom cylinder 7, an arm cylinder 8, and a bucket cylinder 9, respectively, which serve as hydraulic actuators.

The cabin 10 is a cab in which an operator rides, and is mounted on the front left of the upper swing structure 3.

The shovel 100 can establish a connection, for example, a P2P (Peer to Peer) connection, that makes it possible to communicate with another shovel 100, through short-range radio communications of a predetermined method that complies with a predetermined communication protocol, such as Bluetooth (registered trademark) communications or Wi-Fi (registered trademark) communications, for example. This enables the shovel 100 to obtain various kinds of information from another shovel 100 and transmit various kinds of information to another shovel 100, which is described in detail below.

<Configuration of Shovel Support System>

Figure 2:
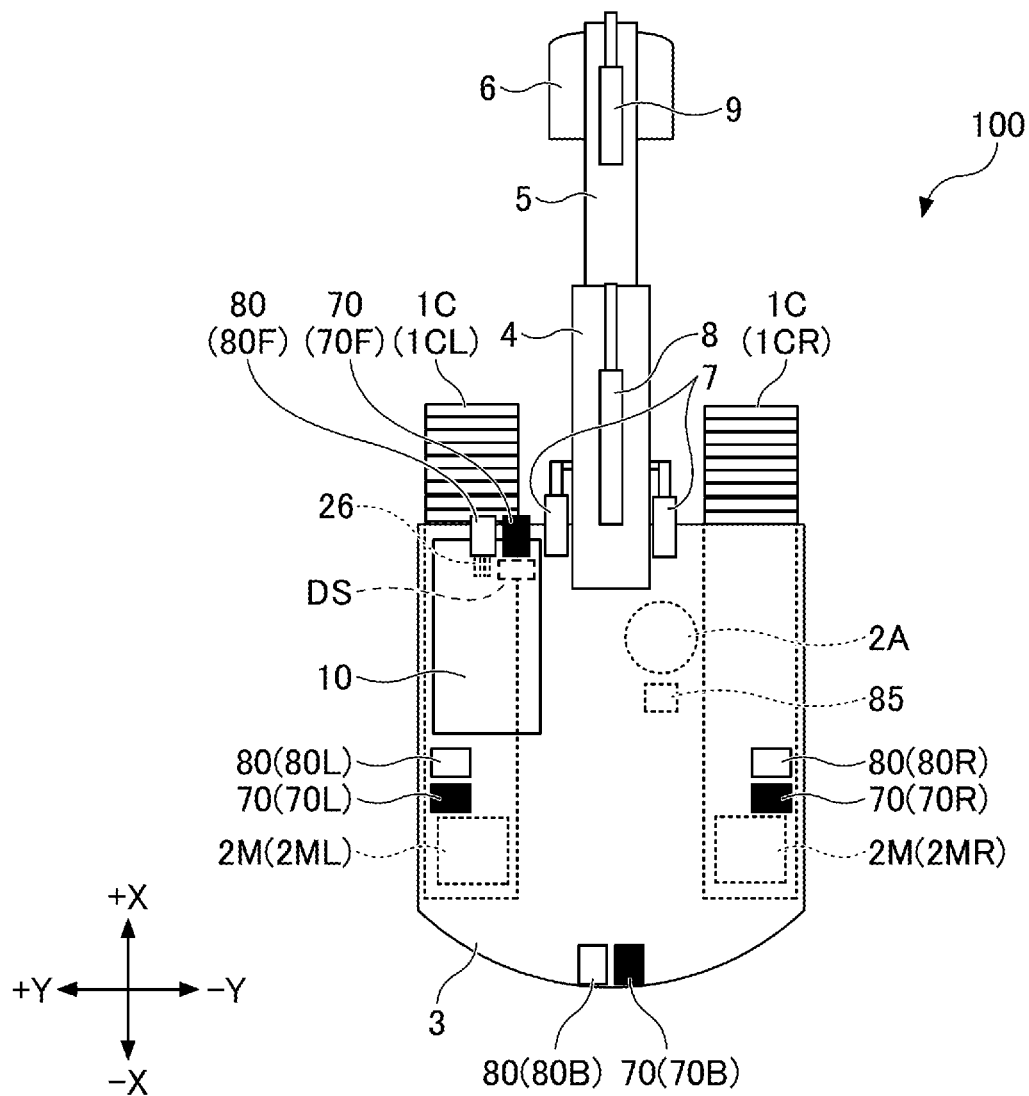
FIG. 2 is a plan view of a shovel.
Figure 3:
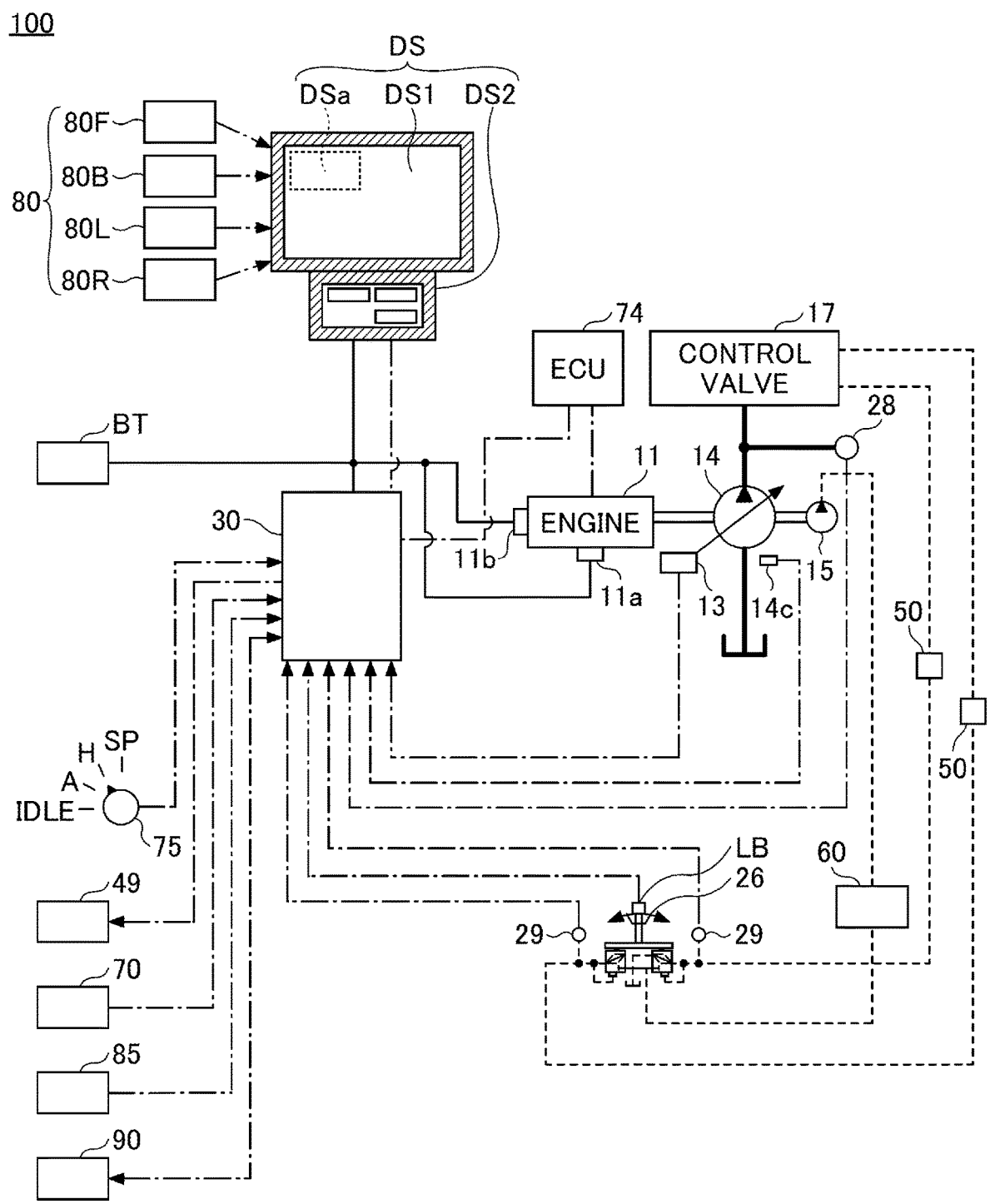
FIG. 3 is a block diagram illustrating an example configuration of the shovel.

Next, with reference to FIGS. 2 and 3 in addition to FIG. 1, a specific configuration of the shovel support system SYS (the shovel 100) is described.

FIG. 2 is a plan view of the shovel 100. FIG. 3 is a configuration diagram illustrating an example configuration of the shovel 100.

As a hydraulic system-related configuration, the shovel 100 includes hydraulic actuators such as the travel hydraulic motors 2M (2ML, 2MR), the swing hydraulic motor 2A, the boom cylinder 7, the arm cylinder 8, and the bucket cylinder 9 as described above. Furthermore, as a hydraulic system-related configuration, the shovel 100 includes an engine 11, a regulator 13, a main pump 14, an oil temperature sensor 14c, a pilot pump 15, a control valve 17, an operating device 26, a discharge pressure sensor 28, an operating pressure sensor 29, a pressure reducing valve 50, and a control valve 60. Furthermore, as a control system-related configuration, the shovel 100 includes a controller 30, an engine control unit (ECU) 74, an engine rotational speed adjustment dial 75, a boom angle sensor S1, an arm angle sensor S2, a bucket angle sensor S3, a machine body tilt sensor S4, a swing state sensor S5, an alarm device 49, an object detector 70, an image capturing device 80, an orientation detector 85, a communications device 90, a display unit DS, and a lever button LB.

The engine 11 is the main power source of the hydraulic system and is mounted on the back of the upper swing structure 3, for example. Specifically, the engine 11 constantly rotates at a preset target rotational speed under the control of the ECU 74 to drive the main pump 14, the pilot pump 15, etc. The engine 11 is, for example, a diesel engine fueled with diesel fuel.

The regulator 13 controls the discharge quantity of the main pump 14. For example, the regulator 13 adjusts the angle (hereinafter "tilt angle") of the swash plate of the main pump 14 in response to a control command from the controller 30.

The main pump 14 is, for example, mounted on the back of the upper swing structure 3 the same as the engine 11, and is driven by the engine 11 as described above to supply hydraulic oil to the control valve 17 through a high-pressure hydraulic line. The main pump 14 is, for example, a variable displacement hydraulic pump. The tilt angle of its swash plate is adjusted by the regulator 13 as described above under the control of the controller 30, so that the stroke length of the piston is adjusted and the discharge flow rate (discharge pressure) is controlled.

The oil temperature sensor 14c detects the temperature of hydraulic oil that flows into the main pump 14. A detection signal corresponding to the detected temperature of hydraulic oil is fed into the controller 30.

The pilot pump 15 is, for example, mounted on the back of the upper swing structure 3 and supplies a pilot pressure to the operating device 26 via a pilot line. The pilot pump 15 is, for example, a fixed displacement hydraulic pump and is driven by the engine 11 as described above.

The control valve 17 is a hydraulic controller that is, for example, mounted in the center of the upper swing structure 3 to control hydraulic actuators according to the operator's operation on the operating device 26. As described above, the control valve 17 is connected to the main pump 14 via a high-pressure hydraulic line to selectively supply hydraulic oil supplied from the main pump 14 to hydraulic actuators (the travel hydraulic motors 2ML and 2MR, the swing hydraulic motor 2A, the boom cylinder 7, the arm cylinder 8, and the bucket cylinder 9) according to the operating state (the operation details) of the operating device 26.

The operating device 26 is provided near the operator seat of the cabin 10 and serves for the operator operating various driven elements (the lower traveling structure 1, the upper swing structure 3, the boom 4, the arm 5, the bucket 6, etc.) In other words, the operating device 26 is configured to be operated by the operator to input operations for operating hydraulic actuators (namely, the travel hydraulic motors 2ML and 2MR, the swing hydraulic motor 2A, the boom cylinder 7, the arm cylinder 8, the bucket cylinder 9, etc.) that drive driven elements. The operating device 26 is connected to the control valve 17 through a pilot line on its secondary side. This allows pilot pressures commensurate with the operating states of the lower traveling structure 1, the upper swing structure 3, the boom 4, the arm 5, the bucket 6, etc., at the operating device 26 to be input to the control valve 17. Therefore, the control valve 17 can selectively drive corresponding hydraulic actuators according to the operating states at the operating device 26. Examples of the operating device 26 include levers and pedals.

The discharge pressure sensor 28 detects the discharge pressure of the main pump 14. A detection signal corresponding to the discharge pressure detected by the discharge pressure sensor 28 is fed into the controller 30.

The operating pressure sensor 29 detects a pilot pressure on the secondary side of the operating device 26, namely, a pilot pressure (hereinafter "operating pressure") corresponding to the operating state (namely, operation details) of each driven element (namely, hydraulic actuator) at the operating device 26. Detection signals of pilot pressures corresponding to the operating states of the lower traveling structure 1, the upper swing structure 3, the boom 4, the arm 5, the bucket 6, etc., at the operating device 26 generated by the operating pressure sensor 29 are fed into the controller 30.

The pressure reducing valve 50 is provided in a pilot line on the secondary side of the operating device 26, namely, a pilot line between the operating device 26 and the control valve 17, and adjusts (reduces) a pilot pressure commensurate with the operation details (the amount of operation) of the operating device 26 under the control of the controller 30. This makes it possible for the controller 30 to control (restrict) the motion of various driven elements by controlling the pressure reducing valve 50.

The control valve 60 switches the enabled state and the disabled state of operations on the operating device 26, namely, the operations of the various driven elements of the shovel 100. The control valve 60 is, for example, a gate lock valve configured to operate in response to a control command from the controller 30. Specifically, the control valve 60 is placed in a pilot line between the pilot pump 15 and the operating device 26, and switches the opening and the blocking (closing) of the pilot line in response to a control command from the controller 30. For example, the gate lock valve is opened to enable operations on the operating device 26 (rendered operative) when a gate lock lever provided near the entrance to the operator seat of the cabin 10 is pulled up, and is closed to disable operations on the operating device 26 (rendered inoperative) when the gate lock lever is pushed down. Accordingly, the controller 30 can restrict (stop) the motion of the shovel 100 by outputting a control command to the control valve 60.

The controller 30 (an example of processing circuitry) is, for example, a control device attached to the inside of the cabin 10 to control the driving of the shovel 100. The controller 30 operates with electric power supplied from a rechargeable battery BT. The same applies hereinafter to the display unit DS and various sensors (for example, the object detector 70, the image capturing device 80, the boom angle sensor S1, etc.). The functions of the controller 30 may be implemented by desired hardware, a combination of desired hardware and software, or the like. The controller 30 is, for example, constituted mainly of a computer that includes a CPU (Central Processing Unit), a memory such as a RAM (Random Access Memory), a nonvolatile secondary storage such as a ROM (Read Only Memory), and an input/output interface with the outside. In this case, the controller 30 can implement various functions by reading one or more programs stored (installed) in the secondary storage, loading the programs into the memory, and causing the programs to be executed on the CPU.

One or more of the functions of the controller 30 may be implemented by another controller (control device). That is, the functions of the controller 30 may be distributed across and implemented by multiple controllers. Furthermore, the rechargeable battery BT is charged with electric power generated by an alternator 11*b* driven by the engine 11.

For example, the controller 30 controls the regulator 13, etc., based on detections signals fed from various sensors such as the boom angle sensor S1, the arm angle sensor S2, the bucket angle sensor S3, the discharge pressure sensor 28, and the operating pressure sensor 29.

Furthermore, for example, when the object detector 70 detects a monitoring target object (for example, a person, a truck, another construction machine, or the like) within a predetermined monitoring area (for example, a work area within five meters from the shovel 100) in an area surrounding the shovel 100, the controller 30 performs control to avoid contact or the like between the shovel 100 and the monitoring target object (hereinafter "contact avoidance control"). Specifically, as an example of the contact avoidance control, the controller 30 may output a control command to the alarm device 49 to cause the alarm device 49 to output an alarm. Furthermore, as an example of the contact avoidance control, the controller 30 may output a control command to the pressure reducing valve 50 or the control valve 60 to restrict the motion of the shovel 100. In this case, a target of motion restriction may be all of the driven elements or only one or some of the driven elements necessary for avoiding contact between the monitoring target object and the shovel 100.

Furthermore, for example, the controller 30 (an example of an obtaining part) obtains information on a work area in an area surrounding the shovel 100 (hereinafter "work area information"), and transmits, to another shovel 100 in the surrounding area, obtained work area information useful to the other shovel 100 through the communications device 90 (an example of a transmitter and a receiver). Specifically, the controller 30 obtains information on whether an object has been detected by the object detector 70 as described below, namely, information on the result of the determination as to whether there is an object in an area surrounding the shovel 100 (hereinafter "object detection information"), and transmits the information to the other shovel 100 in the surrounding area of the shovel 100 through the communications device 90. The object detection information includes, for example, information items such as the presence or absence of an object, the type of an object, and the position of an object. Furthermore, the object detection information may be transmitted only when an object is detected by the object detector 70 or may be transmitted irrespective of the presence or absence of detection. The function between multiple shovels 100 in the shovel support system SYS (hereinafter "information sharing function") is described in detail below (see FIGS. 5 through 7).

Furthermore, for example, the controller 30 performs control with respect to the function of analyzing a situation in a worksite including a work area in an area surrounding the shovel 100 (hereinafter "worksite situation analyzing function"). Specifically, the controller 30 chronologically recognizes objects in the surrounding area based on the outputs of the object detector 70 and the image capturing device 80, and analyzes a situation in the worksite. The worksite situation analyzing function is described in detail below (see FIG. 8).

The ECU 74 controls the driving of the engine 11 under the control of the controller 30. For example, the ECU 74 starts the engine 11, appropriately controlling a fuel injector, etc., in accordance with the operation of a starter 11*a* driven with electric power from the rechargeable battery BT in response to the turning on of the ignition. Furthermore, for example, the ECU 74 appropriately controls the fuel injector, etc., such that the engine 11 constantly rotates at a set rotational speed specified by a control signal from the controller 30 (isochronous control).

The engine 11 may be directly controlled by the controller 30. In this case, the ECU 74 may be omitted.

The engine rotational speed adjustment dial 75 is configured to be operated to adjust the rotational speed of the engine 11 (hereinafter "engine rotational speed"). Data on the setting of the engine rotational speed output from the engine rotational speed adjustment dial 75 are fed into the controller 30. The engine rotational speed adjustment dial 75 is configured to allow the engine rotational speed to be selected from the four levels of SP (Super Power) mode, H (Heavy) mode, A (Auto) mode, and idling mode. The SP mode is an engine rotational speed mode that is selected when it is desired to prioritize workload, in which the engine rotational speed is set at the highest target rotational speed. The H mode is an engine rotational speed mode that is selected when it is desired to satisfy both workload and fuel efficiency, in which the engine rotational speed is set at the second highest target rotational speed. The A mode is an engine rotational speed mode that is selected when it is desired to operate the shovel 100 with low noise while prioritizing fuel efficiency, in which the engine rotational speed is set at the third highest target rotational speed. The idling mode is an engine rotational speed mode selected when it is desired to idle the engine 11, in which the engine rotational speed is set at the lowest target rotational speed. The engine 11 is controlled to be constantly at a target rotational speed corresponding to the engine rotational speed mode set by the engine rotational speed adjustment dial 75 under the control of the ECU 74.

The boom angle sensor S1 is attached to the boom 4 to detect the elevation angle (hereinafter "boom angle") $\theta 1$ of the boom 4 relative to the upper swing structure 3. The boom angle $\theta 1$ is, for example, a rise angle from the lowest position of the boom 4. In this case, the boom angle $\theta 1$ is maximized when the boom 4 is raised most. Examples of the boom angle sensor S1 may include a rotary encoder, an acceleration sensor, a six-axis sensor, and an IMU (Inertial Measurement Unit), which is hereinafter also the case with the arm angle sensor S2, the bucket angle sensor S3, and the machine body tilt sensor S4. The boom angle sensor S1 may also be a stroke sensor attached to the boom cylinder 7. The same is hereinafter also the case with the arm angle sensor S2 and the bucket angle sensor S3. A detection signal corresponding to the boom angle θ1 detected by the boom angle sensor S1 is fed into the controller 30.

The aim angle sensor S2 is attached to the arm 5 to detect the pivot angle (hereinafter "arm angle") θ2 of the arm 5 relative to the boom 4. The aim angle θ2 is, for example, an opening angle from the most closed position of the arm 5. In this case, the arm angle θ2 is maximized when the arm 5 is opened most. A detection signal corresponding to the arm angle θ2 generated by the arm angle sensor S2 is fed into the controller 30.

The bucket angle sensor S3 is attached to the bucket 6 to detect the pivot angle (hereinafter "bucket angle") θ3 of the bucket 6 relative to the arm 5. The bucket angle θ3 is, for example, an opening angle from the most closed position of the bucket 6. In this case, the bucket angle θ3 is maximized when the bucket 6 is opened most. A detection signal corresponding to the bucket angle θ3 detected by the bucket angle sensor S3 is fed into the controller 30.

The machine body tilt sensor S4 detects the tilt state of the machine body (for example, the upper swing structure 3) relative to a predetermined reference plane (for example, a horizontal plane). The machine body tilt sensor S4 is, for example, attached to the upper swing structure 3 to detect the tilt angles of the shovel 100 (namely, the upper swing structure 3) about two axes in its longitudinal direction and lateral direction (hereinafter "longitudinal tilt angle" and "lateral tilt angle"). Detection signals corresponding to the tilt angles (longitudinal tilt angle and lateral tilt angle) detected by the machine body tilt sensor S4 are fed into the controller 30.

The swing state sensor S5 is attached to the upper swing structure 3 to output detection information regarding the swing state of the upper swing structure 3. The swing state sensor S5 detects, for example, the swing angular velocity and the swing angle of the upper swing structure 3. Examples of the swing state sensor S5 include a gyroscope, a resolver, and a rotary encoder.

When the machine body tilt sensor S4 includes a gyroscope, a six-axis sensor, an IMU or the like that can detect angular velocities about three axes, the swing state (for example, the swing angular velocity) of the upper swing structure 3 may be detected based on a detection signal of the machine body tilt sensor S4. In this case, the swing state sensor S5 may be omitted.

The alarm device 49 alerts persons engaged in the work of the shovel 100 (for example, the operator in the cabin 10, a worker in an area surrounding the shovel 100, etc.). The alarm device 49 includes, for example, an interior alarm device for alerting the operator or the like in the cabin 10. The interior alarm device includes, for example, at least one of a sound output device, a vibration generator, and a light emitter provided in the cabin 10. Furthermore, the interior alarm device may include the display unit DS. Furthermore, the alarm device 49 may also include an exterior alarm device for alerting a worker or the like outside the cabin 10 (for example, in an area surrounding the shovel 100). The exterior alarm device includes, for example, at least one of a sound output device and a light emitter provided outside the cabin 10. The sound output device may be, for example, a travel alarm device attached to the bottom surface of the upper swing structure 3. The exterior alarm device may also be a light emitter provided on the upper swing structure 3. For example, when a monitoring target object is detected by the object detector 70 within a monitoring area, the alarm device 49 may so notify a person engaged in the work of the shovel 100 under the control of the controller 30 as described above.

The object detector 70 detects an object in an area surrounding the shovel 100. Example of monitoring target objects include persons, animals, vehicles, construction machinery, buildings, walls, fences, and holes. The object detector 70 includes, for example, at least one of a monocular camera (an example of a camera), an ultrasonic sensor, a millimeter wave radar, a stereo camera, a LIDAR (Light Detecting and Ranging), a distance image sensor, an infrared sensor, etc. The object detector 70 may also be configured to detect a predetermined object within a predetermined area set in an area surrounding the shovel 100. Furthermore, the object detector 70 may also be configured in such a manner as to be able to distinguish between types of objects, for example, in such a manner as to be able to distinguish between a person and an object other than a person. For example, the object detector 70 may be configured to be able to detect a predetermined object and distinguish between types of objects based on a predetermined model such as a pattern recognition model, a machine learning model, or the like. The object detector 70 includes a front sensor 70F, a back sensor 70B, a left sensor 70L, and a right sensor 70R. An output signal corresponding to the result of detection performed by the object detector 70 (each of the front sensor 70F, the back sensor 70B, the left sensor 70L, and the right sensor 70R) is fed into the controller 30.

The front sensor 70F is, for example, attached to the front end of the upper surface of the cabin 10 to detect an object in front of the upper swing structure 3.

The back sensor 70B is, for example, attached to the back end of the upper surface of the upper swing structure 3 to detect an object behind the upper swing structure 3.

The left sensor 70L is, for example, attached to the left end of the upper surface of the upper swing structure 3 to detect an object to the left of the upper swing structure 3.

The right sensor 70R is, for example, attached to the right end of the upper surface of the upper swing structure 3 to detect an object to the right of the upper swing structure 3.

The object detector 70 may merely obtain the ambient environmental information of the shovel 100 (for example, a captured image, data on the reflected wave of a detection wave such as a millimeter wave or a laser beam emitted to a surrounding area, etc.) that forms the basis of object detection, and specific processing of detecting an object, processing of distinguishing between types of objects, etc., may be executed outside the object detector 70 (for example, by the controller 30).

The image capturing device 80 captures an image of an area surrounding the shovel 100. The image capturing device 80 includes a front camera 80F, a back camera 80B, a left camera 80L, and a right camera 80R. An image captured by the image capturing device 80 (each of the front camera 80F, the back camera 80B, the left camera 80L, and the right camera 80R) is fed into the display unit DS. Furthermore, an image captured by the image capturing device 80 is fed into the controller 30 via the display unit DS. An image captured by the image capturing device 80 may be directly fed into the controller 30 without going through the display unit DS.

The front camera 80F is, for example, attached to the front end of the upper surface of the cabin 10 in such a manner as to be next to the front sensor 70F, and captures an image of an area in front of the upper swing structure 3.

The back camera 80B is, for example, attached to the back end of the upper surface of the upper swing structure 3 in such a manner as to be next to the back sensor 70B, and captures an image of an area behind the upper swing structure 3.

The left camera 80L is, for example, attached to the left end of the upper surface of the upper swing structure 3 in such a manner as to be next to the left sensor 70L, and captures an image of an area to the left the upper swing structure 3.

The right camera 80R is, for example, attached to the right end of the upper surface of the upper swing structure 3 in such a manner as to be next to the right sensor 70R, and captures an image of an area to the right the upper swing structure 3.

When the object detector 70 includes an image capturing device such as a monocular camera or a stereo camera, one or more or all of the functions of the image capturing device 80 may be integrated into the object detector 70. For example, when the front sensor 70F includes an image capturing device, the function of the front camera 80F may be integrated into the front sensor 70F. The same is the case with the function of each of the back camera 80B, the left camera 80L, and the right camera 80R when each of the back sensor 70B, the left sensor 70L, and the right sensor 70R includes an image capturing device.

The orientation detector 85 is configured to detect information on the relative relationship between the orientation of the upper swing structure 3 and the orientation of the lower traveling structure 1 (hereinafter "orientation-related information"). For example, the orientation detector 85 may be constituted of a combination of a geomagnetic sensor attached to the lower traveling structure 1 and a geomagnetic sensor attached to the upper swing structure 3. Furthermore, the orientation detector 85 may be constituted of a combination of a GNSS (Global Navigation Satellite System) receiver attached to the lower traveling structure 1 and a GNSS receiver attached to the upper swing structure 3. When the upper swing structure 3 is configured to be driven by an electric motor, the orientation detector 85 may be constituted of a resolver attached to the electric motor. Furthermore, the orientation detector 85 may be, for example, placed at a center joint provided in relation to the swing mechanism 2 that achieves relative rotation between the lower traveling structure 1 and the upper swing structure 3. Information detected by the orientation detector 85 is fed into the controller 30.

The communications device 90 is a device that performs short-range communications of a predetermined method with various devices within a worksite (for example, a position information management apparatus that measures and manages the position information of another construction machine, a worker, etc., within a worksite, etc.), another shovel 100 around the shovel 100, etc. The position information management apparatus is, for example, a terminal apparatus installed in a makeshift office or the like within a worksite of the shovel 100. The terminal apparatus may be, for example, a stationary terminal apparatus such as a desktop computer terminal or may be, for example, a portable terminal such as a smartphone, a tablet terminal, or a laptop computer terminal. Furthermore, the position information management apparatus may be, for example, an edge server installed in a makeshift office or the like within a worksite of the shovel 100 or at a location relatively close to the worksite (for example, a communications facility such as a shelter or a base station near the worksite). Furthermore, the position information management apparatus may be, for example, a cloud server installed in a facility such as a management center provided outside a worksite of the shovel 100. The communications device 90 may be, for example, a Bluetooth communications module, a Wi-Fi communications module, or the like.

The display unit DS is, for example, attached to such a position as to be easily visible to the operator sitting in the operator seat in the cabin 10 or the like, and displays various information images. The display unit DS is, for example, a liquid crystal display or an organic EL (Electroluminescence) display. For example, the display unit DS displays a captured image fed from the image capturing device 80 or a converted image obtained by performing predetermined conversion on the captured image (for example, a viewpoint change image, a composite image into which multiple captured images are combined, or the like). The display unit DS includes a display control part DSa, an image display part DS1, and an operation input part DS2.

The display control part DSa (an example of processing circuitry) performs such control as to cause various information images to be displayed on the image display part DS1 in response to the operator or the like inputting an operation to the operation input part DS2. Like the controller 30, the display control part DSa may be, for example, constituted mainly of a computer including a CPU, a memory, an auxiliary storage, and an interface.

The functions of the display control part DSa may be provided outside the display unit DS, and for example, may be implemented by the controller 30.

The image display part DS1 is a part of the display unit DS that is an area to display information images. The image display part DS1 is constituted of, for example, a liquid crystal panel, an organic EL panel or the like.

The operation input part DS2 receives an operation input with respect to the display unit DS. An operation input signal corresponding to an operation input to the operation input part DS2 is fed into the display control part DSa. Furthermore, the operation input part DS2 may also receive various operation inputs with respect to the shovel 100 other than those with respect to the display unit DS. In this case, operation input signals corresponding to various operation inputs to the operation input part DS2 are fed into the controller 30 directly or indirectly via the display control part DSa. The operation input part DS2 includes, for example, a touchscreen mounted in a liquid crystal panel or an organic EL panel serving as the image display part DS1. Furthermore, the operation input part DS2 may include operating members such as a touchpad, a button, a switch, a toggle, and a lever separately from the image display part DS1.

For example, like the lever button LB, an operation input part that receives various operation inputs with respect to the shovel 100 other than those with respect to the display unit DS may be provided separately from the display unit DS (the operation input part DS2).

The lever button LB is provided on the operating device 26 to receive predetermined operation inputs with respect to the shovel 100. For example, the lever button LB is provided at the top of an operating lever serving as the operating device 26. This makes it possible for the operator or the like to operate the lever button LB while operating the operating lever (for example, to push the lever button LB with a thumb while holding the operating lever with a hand).

<Specific Example of Object Detecting Method>

Next, a specific example of an object detecting method is described with reference to FIG. 4.

Figure 4:
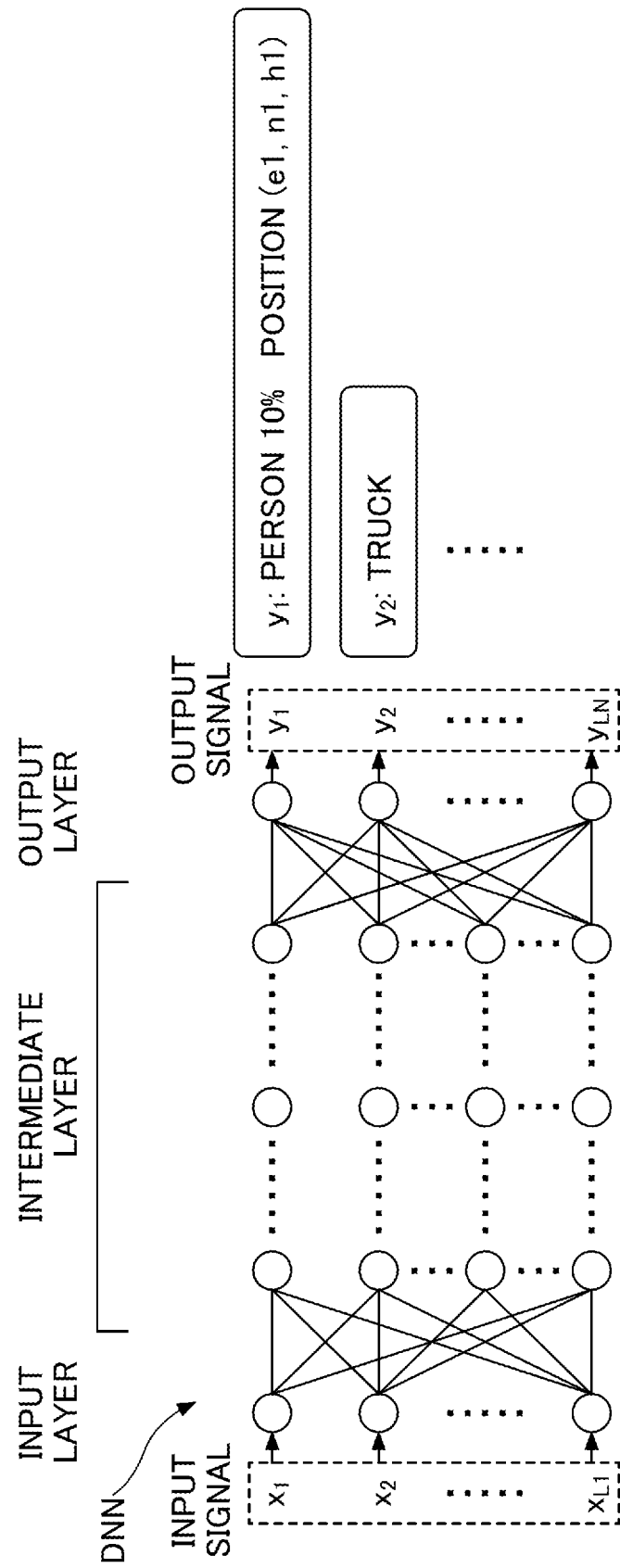
FIG. 4 is a diagram illustrating an example of an object detecting method.

FIG. 4 is a diagram illustrating an example of an object detecting method.

As illustrated in FIG. 4, according to this example, the object detector 70 detects an object in an area surrounding the shovel 100 using a learned model constituted mainly of a neural network DNN.

The neural network DNN is a so-called deep neural network including one or more intermediate layers (hidden layers) between an input layer and an output layer. According to the neural network DNN, a weight parameter that represents the strength of connection with a lower layer is defined with respect to each of the neurons of each intermediate layer. The neural network DNN is configured such that a neuron of each layer outputs the sum of the values obtained by multiplying input values from the upper-layer neurons by their respective defined weight parameters to lower-layer neurons through a threshold function.

Machine learning, specifically, deep learning, is performed on the neural network DNN to optimize the above-described weight parameters. As a result, environmental information (for example, a captured image) obtained by the object detector 70 is input to the neural network DNN as an input signal x, and the neural network DNN can output the probability (predicted probability) of the presence of an object with respect to each of types of objects corresponding to a predefined monitoring target list as an output signal y. According to this example, an output signal y1 output from the neural network DNN represents that the predicted probability of the presence of a "person" in an area surrounding the shovel 100, specifically, within an area in which the object detector 70 obtains environmental information, is 10%.

The neural network DNN is, for example, a convolutional neural network (CNN). The CNN is a neural network to which existing image processing techniques (convolution and pooling) are applied. Specifically, the CNN repeats a combination of convolution and pooling on an image captured by the object detector 70 to extract feature data (a feature map) smaller in size than the captured image. The pixel value of each pixel of the extracted feature map is input to a neural network constituted of fully connected layers, and the output layer of the neural network can output, for example, the predicted probability of the presence of an object with respect to each type of object.

Furthermore, the neural network DNN may also be configured such that a captured image obtained by the object detector 70 is input as the input signal x and the position and the size of an object in the captured image (namely, an area occupied by the object in the captured image) and the type of the object can be output as the output signal y. That is, the neural network DNN may be configured to detect an object in a captured image (determine a part of the captured image that is an area occupied by the object) and determine the classification of the object. Furthermore, in this case, the output signal y may be configured in the format of image data in which the occupied area of the object and information on its classification are added to the captured image serving as the input signal x in a superimposed manner. This enables the object detector 70 to identify, based on the position and size of the occupied area of an object in a captured image output from a learned model (the neural network DNN), the relative position (distance and direction) of the object from the shovel 100. This because the object detector 70 (the front sensor 70F, the back sensor 70B, the left sensor 70L, and the right sensor 70R) is fixed to the upper swing structure 3 and its imaging range (angle of view) is predefined (prefixed). According to this example, the output signal y1 output from the neural network DNN represents that the coordinates of a position at which a "person" is present in an area surrounding the shovel 100, specifically, within an area in which the object detector 70 obtains environmental information, are "(e1, n1, h1)." The object detector 70 can determine the detection of a monitoring target object within a monitoring area when the position of the object detected by a learned model (the neural network DNN) is within the monitoring area and the object is classified as an object in a monitoring target list.

For example, the neural network DNN may be configured to include individual neural networks corresponding to the process of extracting an occupied area (window) in which an object is present in a captured image and the process of identifying the type of the object in the extracted area. That is, the neural network DNN may be configured to perform the detection of an object and the classification of the object in a stepwise manner. Furthermore, for example, the neural network DNN may be configured to include individual neural networks corresponding to the process of defining the classification of an object and the occupied area (Bounding box) of the object with respect to each of grid cells that are a predetermined number of partial areas into which the entire area of a captured image is divided and the process of combining the occupied areas of the object with respect to each type based on the classification of the object with respect to each grid cell and finalizing the occupied area of the object. That is, the neural network DNN may be configured to perform the detection of an object and the classification of the object in parallel.

The object detector 70, for example, calculate a predicted probability with respect to each type of object in a captured image at predetermined control intervals. In calculating a predicted probability, when the determination result of this time matches the determination result of the last time, the object detector 70 may make the predicted probability of this time higher. For example, when an object seen in a predetermined area of a captured image determined to be a "person" (y1) in the last object detection process continues to be determined to be a "person" (y1) this time, the predicted probability of being determined to be a "person" (y1) this time may be made higher than the predicted probability of the last time. As a result, for example, when the results of a determination as to the classification of an object with respect to the same image area continuously match, the predicted probability is calculated to be higher. Therefore, the object detector 70 can reduce erroneous determinations such as a determination in which the predicted probability of an object of a type is made lower because of some noise although the object of the type is actually present.

Furthermore, the object detector 70 may make a determination as to an object in a captured image in view of a motion of the shovel 100, such as traveling or swinging. This is because although an object in an area surrounding the shovel 100 is stationary, the position of the object in a captured image moves as the shovel 100 travels or swings and may become unable to be recognized as the same object. For example, because of the traveling or swinging of the shovel 100, an image area determined to be a "person" (y1) in the process of this time may be different from an image area determined to be a "person" (y1) in the process of the last time. In this case, if the image area determined to be a "person" (y1) in the process of this time is within a predetermined area from the image area determined to be a "person" (y1) in the process of the last time, the object detector 70 may reckon the image areas as the same object and continuously determine a match (that is, determine that the same object continues to be detected. In the case of continuously determining a match, the object detector 70 may include, in addition to the image area used in the last determination, an image area within a predetermined area from this image area in an image area used in the determination of this time. This enables the object detector 70 to continuously determine a match with respect to the same object in an area surrounding the shovel 100 even when the shovel 100 travels or swings.

Furthermore, the object detector 70 may detect an object in an area surrounding the shovel 100 using an object detecting method based on machine learning other than the method using the neural network DNN.

For example, regarding multivariable local features obtained from an image captured by the object detector 70, a learned model representing a boundary that separates (classifies), with respect to each type of object in this multivariable space, the range of being the type of object and the range of not being the type of object may be generated by supervised learning. A technique of machine learning (supervised learning) applied to the generation of information on the boundary may be, for example, a Support Vector Machine (SVM), the k-nearest neighbors algorithm, a Gaussian mixture mode, or the like. This enables the object detector 70 to detect an object based on whether local features obtained from a captured image are within the range of being a predetermined type of object or within the range of not being the type of object, based on the learned model.

<Operation of Shovel Support System Regarding Information Sharing Function (First Example)>

Next, an operation of the shovel support system SYS, specifically, a first example of an operation regarding the information sharing function between multiple shovels 100 in the shovel support system SYS, is described with reference to FIGS. 5 and 6.

Figure 5:
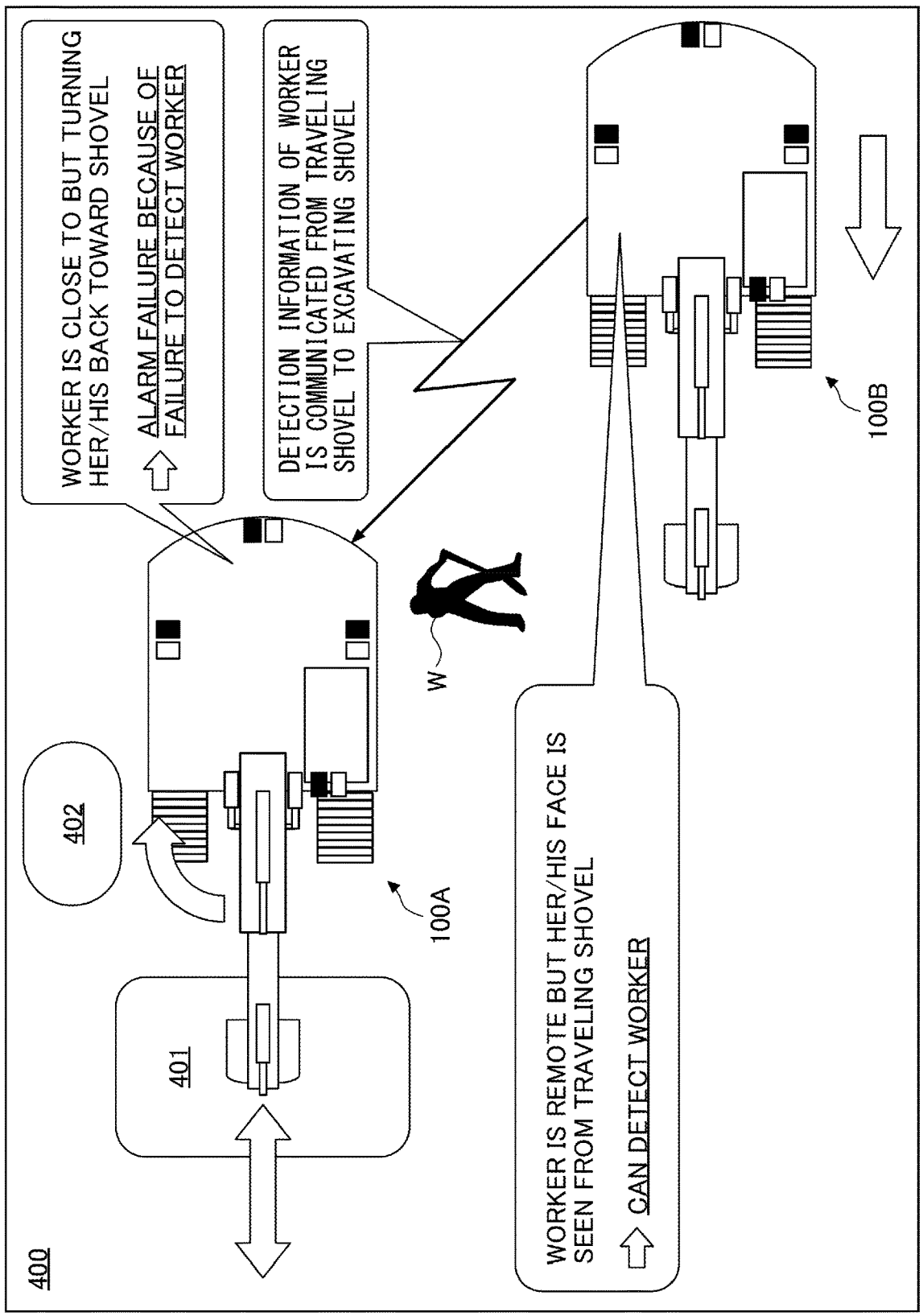
FIG. 5 is a diagram illustrating a first example of an operation of the shovel support system regarding an information sharing function.
Figure 6:
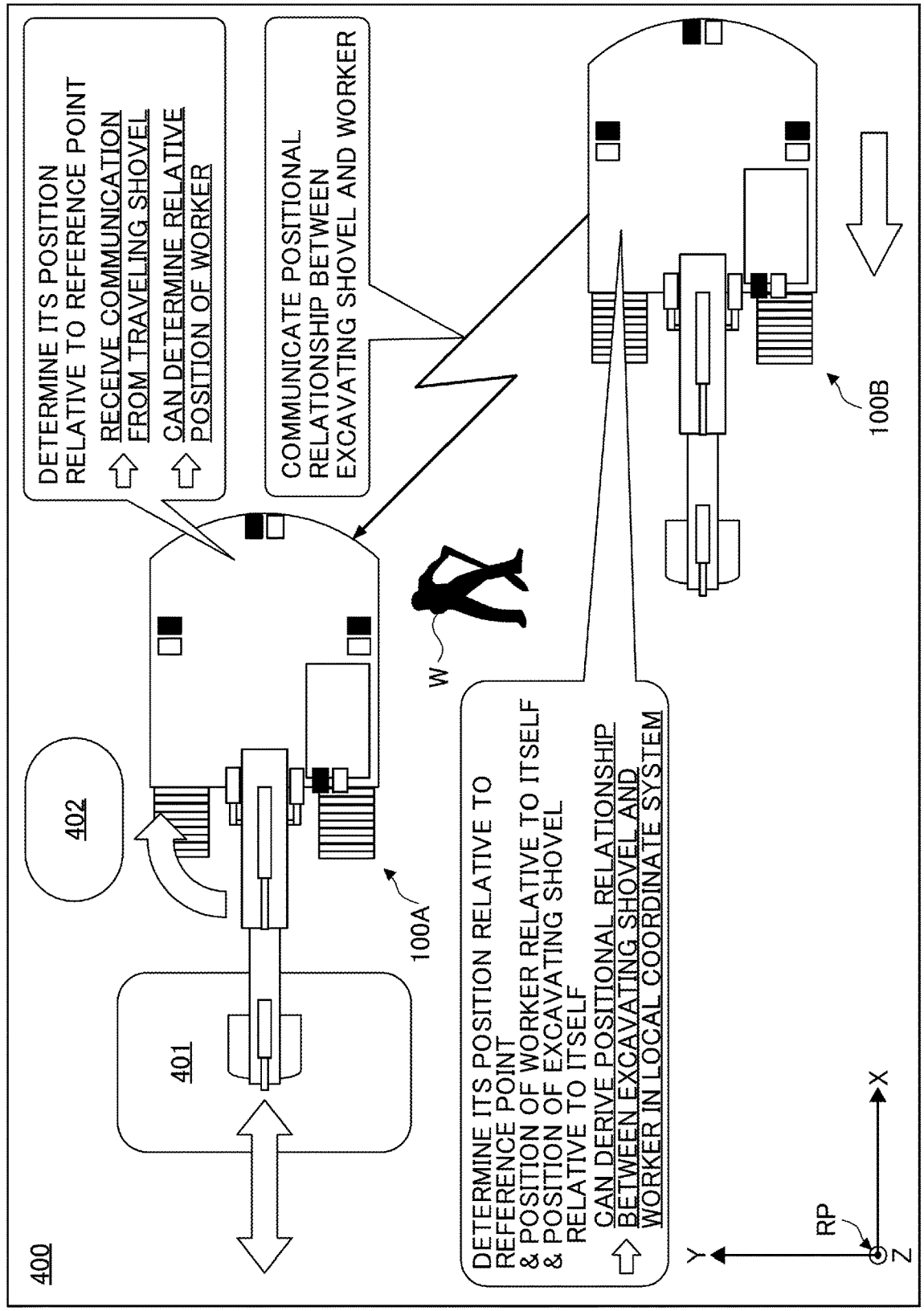
FIG. 6 is a diagram illustrating the first example of the operation of the shovel support system regarding the information sharing function.

FIGS. 5 and 6 are diagrams illustrating the first example of the operation of the shovel support system SYS regarding the information sharing function according to this embodiment. Specifically, FIG. 5 is a diagram illustrating a situation where the object detection information is shared between the shovels 100 in the same worksite (a work area 400) through the information sharing function. FIG. 6 is a diagram illustrating the state of recognition of an object in the surrounding area with respect to each shovel 100 in the same worksite (work area 400), and more specifically, is a diagram illustrating the state of recognition of an object in the surrounding area with respect to each shovel 100 during the operation of FIG. 5 regarding the information sharing function. Hereinafter, according to this example, in order to distinguish between the multiple shovels 100, the shovel 100 that is performing excavation work is referred to as "shovel 100A" for convenience, and the shovel 100 that is traveling is referred to as "shovel 100B" for convenience.

As illustrated in FIG. 5, the shovel 100A is excavating a construction target area 401 and a mound of dumped earth 402 is formed to the right of the shovel 100A in the work area 400. Furthermore, in the work area 400, the shovel 100B is traveling in such a manner as to pass on the left side of the shovel 100A and the construction target area 401. Furthermore, a worker W is at work in a monitoring area relatively close to the shovels 100 between the shovel 100A and a strip-shaped area where the shovel 100B travels and passes.

The worker W is working, turning her/his back toward the shovel 100A with her/his face unseen from the shovel 100A. Therefore, the object detector 70 of the shovel 100A is, for example, prevented from recognizing the face of the worker W in an attempt to detect the worker W from a captured image, and may fail to detect the worker W as a monitoring target object (person) depending on an object detection algorithm. Therefore, according to this example, while the contact avoidance control is supposed to be executed to activate the alarm device 49 in response to the entry of the worker W into the monitoring area close to the shovel 100A, the object detector 70 of the shovel 100A cannot detect the worker W, so that the alarm device 49 is not activated and fails to issue an alarm. Likewise, while a control command is supposed to be output to the pressure reducing valve 50 or the control valve 60 to restrict the motion of the shovel 100, the motion of the shovel 100 continues to be unrestricted. In this case, if the operator of the shovel 100A swings the upper swing structure 3 clockwise to dump excavated earth or the like onto the mound of dumped earth 402 without noticing the worker W, the back of the upper swing structure 3 gets closer in position to, and in the worst case, may contact the worker W.

Meanwhile, the shovel 100B is traveling to pass in front of the worker W, and the worker W is working, facing forward with her/his face visible as seen from the shovel 100B. Therefore, although the shovel 100B is distant from the worker W, the object detector 70 of the shovel 100B is likely to be able to, for example, recognize the face of the worker W from a captured image and detect the worker W. Therefore, according to this example, the object detector 70 of the shovel 100B has successfully detected the worker W.

Here, the controller 30 of the shovel 100B, as described above, obtains the object detection information about the detection of the worker W from the object detector 70, and imparts the object detection information about the detection of the worker W from the shovel 100B to the shovel 100A through the communications device 90. As a result, the controller 30 of the shovel 100A can determine that the worker W is present at a nearby position to the left of the shovel 100A based on the object detection information received from the shovel 100B through the communications device 90. Therefore, the controller 30 of the shovel 100A can activate the alarm device 49 to notify the operator and the worker W in the surrounding area of the detection of the worker W in the monitoring area in an area surrounding the shovel 100A. Accordingly, the operator of the shovel 100 and the worker W can take respective actions for safety, such as the operator suspending the work of the shovel 100 and the worker W moving away from the shovel 100, so that the shovel support system SYS can increase, through the information sharing function, the safety of the work area 400 where the shovels 100A and 100B work.

Specifically, as illustrated in FIG. 6, the controller 30 of the shovel 100B can obtain, from the position information management apparatus in the worksite through the communications device 90, and determine the own position information of the shovel 100B in a local coordinate system whose origin is at a reference point RP of the work area 400 (hereinafter simply "local coordinate system"). Furthermore, the controller 30 of the shovel 100B can determine the position of the worker W relative to the shovel 100B based on the object detection information of the object detector 70. Moreover, the controller 30 of the shovel 100B can determine the position of the shovel 100A that is performing excavation work relative to the shovel 100B based on the object detection information of the object detector 70. Therefore, the controller 30 of the shovel 100B can derive the positional relationship between the shovel 100A and the worker W in the local coordinate system using these pieces of information. Therefore, the controller 30 of the shovel 100B can communicate information on the positional relationship between the shovel 100A and the worker W from the shovel 100B to the shovel 100A through the communications device 90.

Furthermore, for example, when there is a worker working on the upper surface of the upper swing structure 3 of the shovel 100A, the object detector 70 of the shovel 100A cannot detect the worker, whereas the object detector 70 of the shovel 100B can detect the worker. Thus, (the object detector 70 of) the shovel 100B can complementarily monitor an area that is a blind spot of the object detector 70 of the shovel 100A.

The controller 30 of the shovel 100B may obtain the position information of the shovel 100B in the local coordinate system based on the detection information of a positioning device (for example a GNSS receiver) mounted on the shovel 100B and information on the predefined reference point RP of the local coordinate system. The same is the case with the shovel 100A. Furthermore, the controller 30 of the shovel 100B may obtain the position information of the shovel 100B or derive the positional relationship between the shovel 100A and the worker W, etc., in an absolute coordinate system (for example, the World Geodetic System represented by latitude, longitude, and altitude) instead of the local coordinate system. The same is the case with the shovel 100A.

Meanwhile, the controller 30 of the shovel 100A can obtain, from the position information management apparatus in the worksite through the communications device 90, and determine the own position information of the shovel 100A in the local coordinate system. Furthermore, the controller 30 of the shovel 100A can determine the positional relationship between the shovel 100A and the worker W by receiving a communication from the traveling shovel 100B. Therefore, the controller 30 of the shovel 100A can determine the position of the worker W relative to the shovel 100A in the local coordinate system using these pieces of information. Accordingly, the controller 30 of the shovel 100A can activate the alarm device 49 or restrict, for example, brake or stop, the motion of the shovel 100 after determining whether the worker W is in the monitoring area. In this case, safety-related correspondence such as whether to continue the motion, decelerate the motion, and stop the motion based on the type of a detected object is preset. In particular, in the case of the shovel 100, which includes many types of actuators, the correspondence such as whether to continue the motion, decelerate the motion, and stop the motion based on the type of a detected object may be preset with respect to each actuator.

Furthermore, the shovel 100A, which receives object detection detection information from the single shovel 100B according to this example, may further receive object detection information from another shovel 100. That is, a shovel 100 may receive object detection information from multiple shovels 100 around that perform work. In this case, the shovel 100 may determine the presence or absence of a monitoring target such as a worker around based on a comprehensive judgment of the object detection information received from the multiple shovels 100. Specifically, the object detection information received from the multiple shovels 100 may include both object detection information that affirms the presence of a monitoring target and object detection information that negates the presence of the monitoring target although communicated from the shovel 100 so positioned as to be able to detect the monitoring target. Therefore, the controller 30 of the shovel 100 on the receiver side may, for example, give priority to safety and preferentially select the object detection information that affirms the presence of the monitoring target. Furthermore, the controller 30 of the shovel 100 on the receiver side may focus on the balance between the safety of the shovel 100 and the degradation of work efficiency due to misinformation and determine which to select by comparing the number of items of the object detection information that affirms the presence of the monitoring target and the number of items of the object detection information that negates the presence of the monitoring target or by comparing pieces of information on the accuracy of the object detectors 70 of the shovels 100 that have transmitted the object detection information.

Furthermore, when the position information of an objected detected by a shovel 100 is equal to the position information of object detection information transmitted from another shovel 100 around, the controller 30 of the shovel 100 may compare both and select the one that is higher in identification accuracy. For example, when an object present at the same position is identified as wood by the controller 30 of a shovel 100 with an identification rate of 50% and is identified as a person by the controller 30 of another shovel 100 around with an identification rate of 60%, the controller 30 of the shovel 100 selects the identification result of the controller 30 of the other shovel 100 around on which the object detector 70 with higher accuracy is mounted.

Furthermore, when the position information of an objected detected by a shovel 100 is equal to the position information of object detection information transmitted from a shovel 100 around, the controller 30 of the shovel 100 may compare both and control the shovel 100 based on the information higher in the degree of safety. For example, when the controller 30 of a shovel 100 makes a determination that the motion be continued (namely, a determination of a lower degree of safety) based on the identification result that an object is identified as wood with an identification rate of 50% and the controller 30 of another shovel 100 around makes a determination that the motion be stopped (namely, a determination of a higher degree of safety) based on the identification result that an object is identified as a person with an identification rate of 30% with respect to the object present at the same position, the controller 30 of the shovel 100 controls the shovel 100 based on the determination result of a higher degree of safety, namely, the determination result in the other shovel 100 around, although the identification result of the controller 30 of the other shovel 100 around is a determination that the object is a person with an identification rate of 30%.

Furthermore, while the case of avoiding the alarm failure of the alarm device 49, etc., in the shovel 100 (the shovel 100A) is illustrated by way of example in this example, the information sharing function may also be used, as a matter of course, in the case of avoiding the false alarm of the alarm device 49, etc., in the shovel 100. For example, it is assumed that in a situation where there is no monitoring object in an area surrounding the shovel 100A, the object detector 70 of the shovel 100A detects a non-existent object at the position of the worker W in FIGS. 5 and 6. In this case, the object detector 70 of the shovel 100B is likely to determine that no monitoring target is present to the left of the shovel 100A and output object detection information that indicates the absence of a monitoring target. Therefore, the controller 30 of the shovel 100B transmits object detection information that denies the presence of a monitoring target from the shovel 100B to the shovel 100A through the communications device 90. Accordingly, the controller 30 of the shovel 100A determines that no monitoring target is present, prioritizing the communication from the shovel 100B based on a certain criterion for determination, and can cancel the activation of the alarm device 49 or stop the alarm device 49 after the start of its activation, or can cancel restricting the motion of the shovel 100 or stop restricting the motion of the shovel 100 after the start of the restriction. In this case, examples of criteria for determination may include that the information on the accuracy of the object detector 70 of the shovel 100B that has transmitted the object detection information exceeds a certain reference level, that the information on the existence probability (predicted probability) of a monitoring target at the time of determining that no monitoring target is present included in the object detection information falls below a certain reference level.

Thus, the shovel 100B determines the presence or absence of a monitoring target in the monitoring area of the shovel 100B and also determines the presence or absence of a monitoring target outside the monitoring area of the shovel 100B as well. In this case, the controller 30 of the shovel 100B stores the results of each determination (for example, information on the presence or absence of a monitoring target, the type of a monitoring target, the position of a monitoring target, etc.) in a predetermined storage (for example, a secondary storage). Likewise, the shovel 100A determines the presence or absence of a monitoring target in the monitoring area of the shovel 100A and also determines the presence or absence of a monitoring target outside the monitoring area of the shovel 100A as well. In this case, the controller 30 of the shovel 100A stores the results of each determination (for example, information on the presence or absence of a monitoring target, the type of a monitoring target, the position of a monitoring target, etc.) in a predetermined storage (for example, a secondary storage). Therefore, it is possible to complementarily monitor each other's area that is a blind spot of the object detector 70 of the shovel 100. Furthermore, a determination as to whether a monitoring target is present outside the monitoring area of the shovel 100 is made when the shovel 100 is disabled as well.

Furthermore, the shovel 100A may receive object detection information from, instead of or in addition to the shovel 100B, a stationary apparatus installed at a fixed point in the work area 400 and including the same object detector as the object detector 70. That is, the shovel support system SYS may include the above-described stationary apparatus placed at a fixed position relatively close to the multiple shovels 100 (for example, in a worksite (work area) where the multiple shovels 100 work) in addition to the multiple shovels 100. This enables the shovel 100A to receive object detection information about the presence or absence of an object in the surrounding area not only from the shovel 100B but also from the stationary apparatus.

<Operation of Shovel Support System Regarding Information Sharing Function (Second Example)>

Next, a second example of the operation of the shovel support system SYS regarding the information sharing function is described.

The work area information shared between or among multiple shovels 100 may be information on a construction area within a work area.

For example, when multiple shovels 100 are assigned to the same construction area, information on the construction area, such as information on an intended construction surface and virtual planes representing the outer edge of a working envelope (a range in which driven elements such as the lower traveling structure 1, the upper swing structure 3, and the attachment are allowed to move during work) (hereinafter "working envelope virtual planes"), set in a shovel 100 is transmitted to another shovel 100. This allows the information on the construction area set in the shovel 100 to be directly used in the other shovel 100, thus making it possible to improve work efficiency.

Specifically, when two shovels 100 start to dig a relatively long trench from both ends, the controller 30 of a shovel 100 may transmit information on an intended construction surface corresponding to the side surface and the bottom surface of the trench, set in the shovel 100 and indicating the shape of the trench, to the other shovel 100 through the communications device 90. In this case, in the shovel 100, the information on the intended construction surface indicating the shape of the trench may be, for example, set by the operator's operation input through the operation input part DS2, or may be, for example, automatically set by the wall surface and the bottom surface of the trench that has been partly dug and sheet piles or the like that are provided on the wall surface being recognized through an image captured by the image capturing device 80, or the like.

Furthermore, when multiple shovels 100 work in the same work area, the controller 30 of a shovel 100 may transmit information on working envelope virtual planes set in the shovel 100 to another shovel 100 through the communications device 90. In this case, in the shovel 100, the information on working envelope virtual planes may be, for example, set by the operator's operation input through the operation input part DS2, or may be, for example, automatically recognized by multiple road cones, obstacles (for example, fences, utility poles, and electric wires), etc., that define the working envelope being recognized through an image captured by the image capturing device 80, or the like.

<Operation of Shovel Support System Regarding Information Sharing Function (Third Example)>

Next, a third example of the operation of the shovel support system SYS regarding the information sharing function is described with reference to FIG. 7.

According to this example, the shovel support system SYS includes a drone 700 in addition to the multiple shovels 100.

Figure 7:
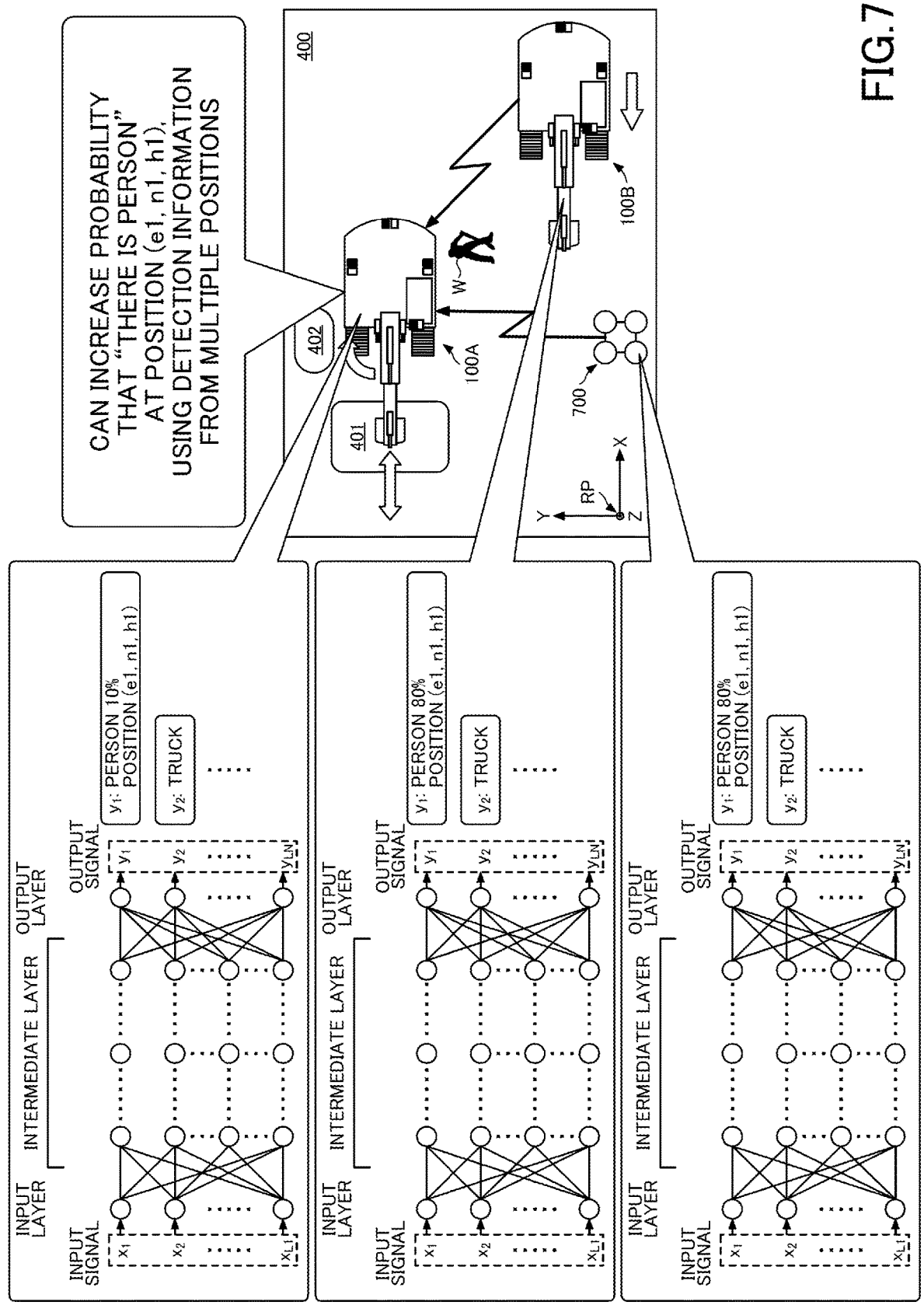
FIG. 7 is a diagram illustrating a third example of the operation of the shovel support system regarding the information sharing function.

FIG. 7 is a diagram illustrating the third example of the operation of the shovel support system SYS regarding the information sharing function according to this embodiment. This example is described based on the assumption that the shovels 100A and 100B are in the same situation as in the above-described first example (FIGS. 5 and 6) and that the drone 700 having the same object detecting function as the shovel 100 is flying over the work area 400.

The worker W in the work area 400 is working, turning her/his back toward the shovel 100A with her/his face unseen from the shovel 100A. Therefore, according to this example, even when inputting the obtained captured image to the learned model (the neural network DNN), the object detector 70 of the shovel 100A has an output of 10% as the predicted probability of the presence of a "person" and is unable to detect the worker W at the position "(e1, n1, h1)" in the local coordinate system.

Meanwhile, the shovel 100B is traveling to pass in front of the worker W, and the worker W is working, facing forward with her/his face visible as seen from the shovel 100B. Therefore, by inputting the obtained captured image to the learned model (the neural network DNN), the object detector 70 of the shovel 100B has an output of 80% as the predicted probability of the presence of a "person" to successfully detect the worker W at the position "(e1, n1, h1)" in the local coordinate system. Therefore, the controller 30 of the shovel 100B transmits object detection information regarding the detection of the worker W obtained from the object detector 70 to the shovel 100A through the communications device 90, the same as in the case of the above-described first example.

Furthermore, the drone 700 is flying over the front side of the worker W, and the worker W is working, facing forward with her/his face visible as seen from the drone 700. Therefore, by inputting an image captured by an image capturing device mounted on the drone 700 to a learned model (a neural network), the drone 700 has an output of 80% as the predicted probability of the presence of a "person" to successfully detect the worker W at the position "(e1, n1, h1)" in the local coordinate system. Accordingly, the drone 700 transmits object detection information regarding the detection of the worker W to the shovels 100A and 100B through a predetermined communications device mounted on the drone 700.

The drone 700 may detect an object using environmental information or an object detecting method that is different from that used by the shovel 100 (the object detector 70).

As described above, the shovel 100A, while being unable to detect the worker W using its own object detector 70, can receive object detection information regarding the detection of the worker W at the coordinates "(e1, n1, h1)" in the local coordinate system from the shovel 100B and the drone 700. This enables the shovel 100A to recognize the presence of the worker W that cannot be detected by its own object detector 70 through the function of sharing information with the shovel 100B and the drone 700. Furthermore, the shovel 100A can receive object detection information from the drone 700 in addition to the object detection information from the shovel 100B. Therefore, by using the object detection information from multiple devices, the shovel 100A can increase the probability that a person (the worker W) is at the coordinates "(e1, n1, h1)" in the local coordinate system. Therefore, the shovel 100A can improve the accuracy of detecting an object in the surrounding area.

The shovels 100 (100A, 100B) may have the information sharing function that can receive object detection information from, instead of or in addition to the drone 700, another device that can detect an object in the work area 400. The other device may be, for example, a stationary camera installed in the work area 400.

<Worksite Situation Analyzing Function of Shovel>

Next, an operation of the shovel 100 regarding the worksite situation analyzing function is described with reference to FIG. 8.

Figure 8:
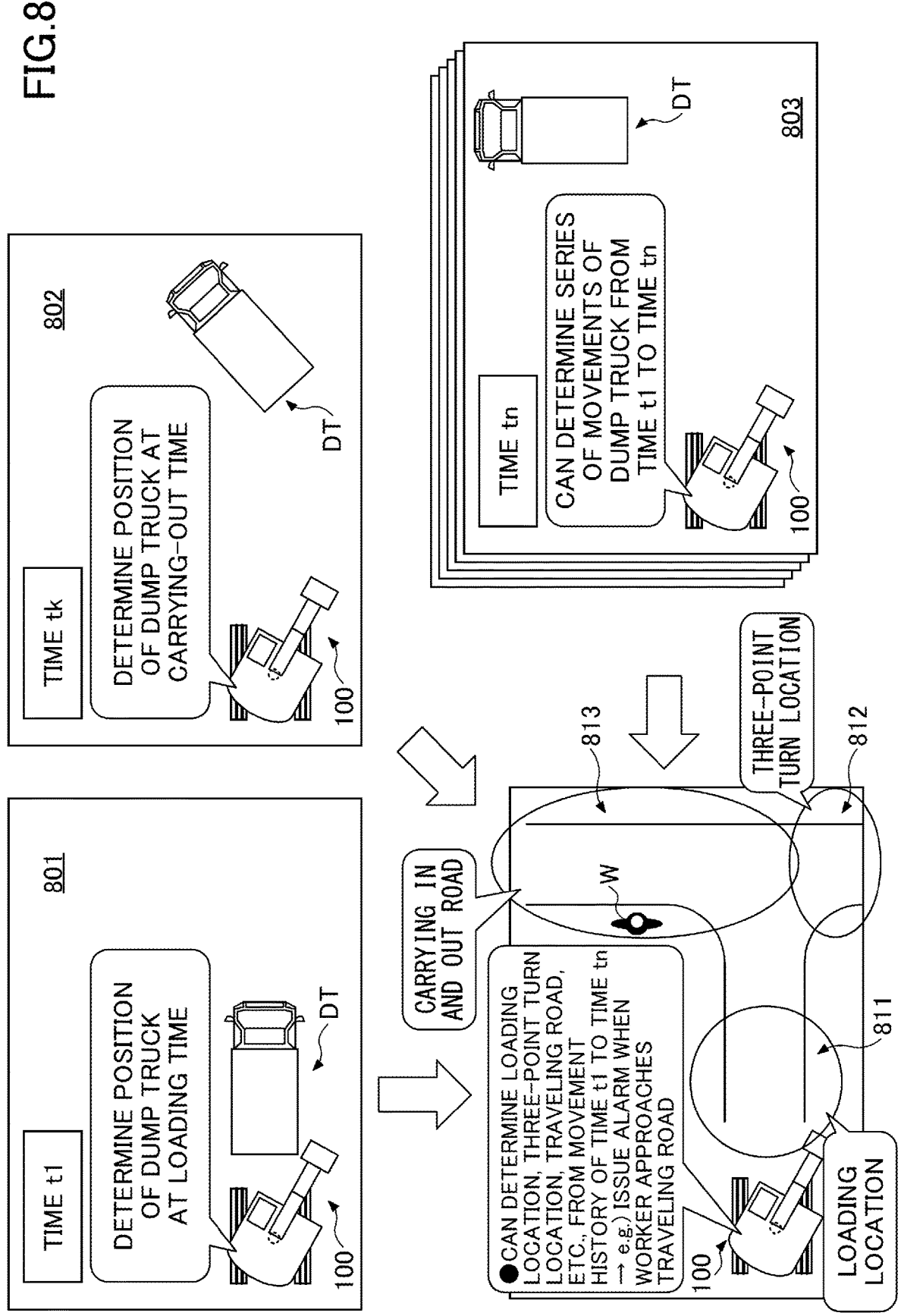
FIG. 8 is a diagram illustrating an example of an operation of the shovel regarding a worksite situation analyzing function.

FIG. 8 is a diagram illustrating an operation of the shovel 100 regarding the worksite situation analyzing function. Specifically, FIG. 8 is a diagram illustrating the process of analyzing the movement situations (movement history) of a dump truck DT in a worksite in a time series of Time t1 to Time tn (n: an integer greater than or equal to 3) and identifying the traveling road of the dump truck DT in the worksite.

As illustrated in FIG. 8, the shovel 100 identifies the movement situation of the dump truck DT in the work site in the time series of Time t1 to Time tn.

For example, as illustrated in Situation 801, at Time t1, the shovel 100 is loading the stopped dump truck DT with earth. As such, the shovel 100 (the controller 30) can determine the position of the dump truck DT at the time of loading earth from the coordinates of the dump truck DT in the local coordinate system in the worksite at Time t1 detected by the object detector 70.

Furthermore, for example, as illustrated in Situation 802, at Time tk (k: an integer satisfying 1<k<n), the shovel 100 is finished with loading earth and the dump truck DT is traveling and moving toward the entrance/exit of the worksite to carry out the earth. As such, the shovel 100 (the controller 30) can determine the position of the dump truck DT at the time of carrying out from the coordinates of the dump truck DT in the local coordinate system in the worksite at Time tk detected by the object detector 70.

Furthermore, for example, as illustrated in Situation 803, at Time tn, the dump truck DT has arrived at the entrance/exit of the worksite. As such, the shovel 100 (the controller 30) can determine a series of movements of the dump truck DT from Time t1 (the time of loading) to Time tn (the time of passing through the entryway of the worksite).

By analyzing the movement history of Time t1 to Time tn, the controller 30 can determine the traveling road (traveling route) of a vehicle such as the dump truck DT in the worksite. The traveling road includes a loading location 811 of the dump truck DT, a three-point turn location 812 of the dump truck DT for the time of carrying in and the time of carrying out, and a carrying in and out road 813 along which the dump truck DT travels toward the entrance/exit of the worksite.

Furthermore, the controller 30 may determine not only the movement history of the dump truck DT but also the position of a building (for example, a makeshift office or the like) in the worksite detected by the object detector 70.

For example, no fixed road is laid in the worksite of the shovel 100, and normally, it is often the case that there is no road information or the like that represents the traveling road of a dump truck or the like in the worksite. Furthermore, the location of installation of a makeshift building or the like in the worksite may be changed from the planned location depending on a worksite situation or the like. Furthermore, the traveling route of a dump truck or the like may often be changed depending on the progress of work, weather, etc., at the worksite. Therefore, it is difficult to determine a worksite situation only from information representing a current situation in the worksite, for example.

In contrast, according to this example, the shovel 100 (the controller 30) can determine a worksite situation, such as a traveling road, by analyzing the movement history of a vehicle such as the dump truck DT in the worksite, using object detection information in a time series.

Furthermore, when a person such as a worker enters a high-risk space (for example, an area relatively close to a traveling road), the shovel 100 (the controller 30) may alert the worker based on the determined worksite situation. The controller 30 may, for example, activate the alarm device 49 to alert the worker. Furthermore, the controller 30 may also alert the worker by vibrating a portable terminal carried by the worker by transmitting a predetermined signal to the portable terminal, using the communications device 90. For example, as illustrated in FIG. 8, when the worker W is detected at a position very close to the traveling road (the carrying in and out road 813) by the object detector 70, the controller 30 may activate the alarm device 49 or transmit a predetermined signal to a portable terminal of the worker W using the communications device 90. According to this, the shovel 100 can increase safety in the worksite.

[Another Example of Shovel Support System SYS]

Next, another example of the shovel support system SYS is described with reference to FIG. 9.

FIG. 9 is a schematic diagram illustrating another example of the shovel support system SYS.

As illustrated in FIG. 9, according to this example, the shovel support system SYS includes an assist device 200 and a management apparatus 300, in addition to multiple shovels 100. The shovel support system SYS manages the multiple shovels 100 with the management apparatus 300.

The number of assist devices 200 included in the shovel support system SYS may be one or more. Likewise, the number of management apparatuses 300 included in the shovel support system SYS may be one or more.

The assist device 200 is connected to the management apparatus 300 through a predetermined communication line in such a manner as to be able to communicate with the management apparatus 300. Furthermore, the assist device 200 may be connected to the shovel 100 through a predetermined communication line in such a manner as to be able to communicate with the shovel 100. Examples of predetermined communication lines may include a mobile communication network including a base station as a terminal end, a satellite communication network using a communications satellite, and a short-range radio communication network based on a communication standard such as Bluetooth (registered trademark) or Wi-Fi. The assist device 200 is, for example, a user terminal used by users such as an operator, the owner, etc., of the shovel 100, a worker, a supervisor, etc., at a worksite, a manager, a worker, etc., of the management apparatus 300 (hereinafter "assist device users"). Examples of the assist device 200 include portable terminals such as a laptop computer terminal, a tablet terminal, and a smartphone. Furthermore, the assist device 200 may also be, for example, a stationary terminal apparatus such as a desktop computer terminal.

The management apparatus 300 is connected to the shovel 100 and the assist device 200 through a predetermined communication line in such a manner as to be able to communicate with the shovel 100 and the assist device 200. The management apparatus 300 is, for example, a cloud server installed in a management center outside a worksite. The management apparatus 300 may also be, for example, an edge server installed in a makeshift office or the like within a worksite or in a communications facility relatively close to a worksite (for example, a base station or a shelter). Furthermore, the management apparatus 300 may also be, for example, a terminal apparatus used in a worksite. Examples of terminal apparatuses may include portable terminals such as a laptop computer terminal, a tablet terminal, and a smartphone and stationary terminal apparatuses such as a desktop computer terminal.

At least one of the assist device 200 and the management apparatus 300 may be provided with a display unit and an operating device for remote control. In this case, an operator using the assist device 200 or the management apparatus 300 may remotely control the shovel 100 using the operating device for remote control. The assist device 200 and the management apparatus 300 equipped with the operating device for remote control is connected to the controller 30 mounted in the shovel 100 through a predetermined communication line such as a short-range communication network, a mobile communication network, or a satellite communication network, for example.

Furthermore, an information image having the same contents as those displayable on the display unit DS in the cabin 10 (for example, image information showing a situation in an area surrounding the shovel 100 and various settings screens) may be displayed on the display units of the assist device 200 and the management apparatus 300. The image information showing a situation in an area surrounding the shovel 100 may be generated based on an image captured by the image capturing device 80, or the like. This enables assist device users and management apparatus users to remotely control the shovel 100 and provide various settings with respect to the shovel 100 while checking a situation in an area surrounding the shovel 100.

Furthermore, the management apparatus 300 may execute a function corresponding to, for example, the position information management apparatus of an example as described above.

Furthermore, the controller 30 of the shovel 100 may, for example, transmit various kinds of information to at least one of the assist device 200 and the management apparatus 300 using the communications device 90. The controller 30 may, for example, transmit at least one of the output of the object detector 70 (object detection information), an image captured by the image capturing device 80, etc., to at least one of the assist device 200 and the management apparatus 300. Furthermore, the controller 30 of the shovel 100 may, for example, transmit information on the results of an analysis conducted by the worksite situation analyzing function (namely, information representing a worksite situation) to at least one of the assist device 200 and the management apparatus 300. This enables the shovel support system SYS to cause various kinds of information such as object detection information and information representing a worksite situation obtained at the shovel 100 to be stored in a predetermined storage part in the assist device 200 and the management apparatus 300. Furthermore, the assist device users and the management apparatus users can check object detection information, information representing a worksite situation, etc., through the display units of the assist device 200 and the management apparatus 300.

Thus, according to this example, the shovel support system SYS can cause information on the shovel 100 (information obtained by the shovel 100) to be shared among the assist device users and the management apparatus users. Furthermore, according to this example, the shovel support system SYS can cause the object detection information of the shovel 100 to be stored in a predetermined storage part in the assist device 200 and the management apparatus 300. For example, the assist device 200 and the management apparatus 300 can chronologically store monitoring target information such as the type of a monitoring target and the position of a monitoring target outside the monitoring area of the shovel 100 in a storage part. In this case, the monitoring target information stored in the storage parts of the assist device 200 and the management apparatus 300 may be information on the type of a monitoring target, the position of a monitoring target, etc., outside the monitoring area of the shovel 100 and within the monitoring area of another shovel 100.

[Operation]

Next, the operation of the shovel support system SYS according to this embodiment is described.

According to this embodiment, the controller 30 obtains information on a work area in an area surrounding a construction machine, and the communications device 90 transmits the information obtained by the controller 30 to another shovel 100 in the surrounding area of the shovel 100.

This allows information on a work area obtained by a shovel 100 to be available to another shovel 100 that performs work in the same work area.

Furthermore, according to this embodiment, the information on the work area obtained by the controller 30 may include the determination result of a predetermined determination as to the work area (for example, the determination of the presence or absence of an object in the work area, the determination of the type of the object, or the like) that is made based on an image captured by a camera (the object detector 70) that captures an image of the work area in the area surrounding the shovel 100.

This enables information on the determination of the presence or absence of an object in a work area, the determination of the type of the object, or the like obtained by a shovel 100 to be available to another shovel 100 that performs work in the same work area. Therefore, for example, even when the other shovel 100 has failed in detecting an object in the monitoring area, the other shovel 100 can perform contact avoidance control to avoid contact or the like with the object, using information on the object detected in the shovel 100. Accordingly, it is possible to increase the safety of the shovel 100.

Furthermore, according to this embodiment, the information on the work area obtained by the controller 30 may include information on a construction area of the work area (for example, information on an intended construction surface and information on working envelope virtual planes).

This enables information on a construction area obtained at a shovel 100 to be available to another shovel 100 that performs work in the same work area. Therefore, for example, the other shovel 100 can directly use information on the construction area set in the shovel 100. Accordingly, it is possible to increase the work efficiency of the entire work performed by the multiple shovels 100.

Furthermore, according to this embodiment, the communications device 90 may receive information on the work area from a predetermined apparatus positioned in the area surrounding the shovel 100 (for example, another shovel 100, a stationary apparatus having a stationary camera that captures an image of the work area in the surrounding area, the drone 700 that flies over the work area, or the like).

This enables the shovel 100 that transmits information on a work area to use information on the work area obtained by predetermined apparatuses, such as another shovel 100, a stationary apparatus, and the drone 700.

Furthermore, according to this embodiment, the communications device 90 may receive an image captured by a stationary camera or information on the work area based on the captured image (for example, information on a determination as to whether there is an object in the work area) from a stationary apparatus.

This enables the shovel 100 to specifically use an image captured by a stationary camera included in a stationary apparatus or information on a work area based on the captured image.

[Variations and Modifications]

An embodiment is described in detail above. The present disclosure, however, is not limited to the specific embodiment, and various variations and changes may be made within the scope of the subject matter described in the claims.

For example, while the multiple shovels 100 transmit and receive work area information, etc., to and from each other according to the above-described embodiment, multiple construction machines including other construction machines, instead of or in addition to the shovels 100, may transmit and receive work area information, etc., to and from each other. That is, the shovel support system SYS according to the above-described embodiment may include, instead of or in addition to the shovels 100, other construction machines such as road machines including bulldozers, wheel loaders, and asphalt finishers and forestry machines with a harvester or the like.

What is claimed is:

1. A construction machine comprising:
    an object detector configured to obtain information on a work area in an area surrounding the construction machine;
    processing circuitry configured to
        derive a positional relationship between an object and another construction machine in the work area based on the information obtained by the object detector; and
    a transmitter configured to transmit the derived positional relationship between the object and said another construction machine in the work area to said another construction machine,
    wherein the processing circuitry is configured to, in response to determining that no object is in an area surrounding said another construction machine, cause the transmitter to transmit information indicating that no object is in the area surrounding said another construction machine to said another construction machine, when said another construction machine falsely detects the object in the area surrounding said another construction machine.

2. The construction machine as claimed in claim 1, further comprising:
    a camera configured to capture an image of the work area,
    wherein the processing circuitry is configured to obtain information on a determination result of a predetermined determination as to the work area made based on the image captured by the camera.

3. The construction machine as claimed in claim 2, wherein the predetermined determination includes a determination as to whether there is the object in the work area.

4. The construction machine as claimed in claim 2, wherein the information on the work area obtained by the object detector includes information on a construction area of the work area.

5. The construction machine as claimed in claim 1, further comprising:
    a receiver configured to receive information on the work area from a predetermined apparatus positioned in the area surrounding the construction machine.

6. The construction machine as claimed in claim 5, wherein
    the predetermined apparatus includes a stationary apparatus including a stationary camera configured to capture an image of the work area, and
    the receiver is configured to receive the image captured by the stationary camera or information on the work area based on the captured image from the stationary apparatus.

7. The construction machine as claimed in claim 5, wherein
    the predetermined apparatus includes said another construction machine, and
    the receiver is configured to receive information on the work area obtained at said another construction machine.

8. The construction machine as claimed in claim 1, wherein the object is within a monitoring area of an object detector of said another construction machine and is undetected by the object detector of said another construction machine.

9. The construction machine as claimed in claim 1, wherein the processing circuitry is further configured to
    obtain position information of the construction machine in the work area on a predetermined coordinate system, determine presence or absence of the object in the work area based on the information obtained by the object detector, determine a position of the object relative to the construction machine and a position of said another construction machine in the work area relative to the construction machine on the predetermined coordinate system, based on the information obtained by the object detector and the obtained position information of the construction machine, in response to determining the presence of the object in the work area, and derive the positional relationship between the object and said another construction machine in the predetermined coordinate system, using the determined position of the object and the determined position of said another construction machine.

10. The construction machine as claimed in claim 1, wherein the information transmitted to said another construction machine includes information on existence probability of the object when the processing circuitry determines that no object is in the area surrounding said another construction machine.

11. The construction machine as claimed in claim 1, wherein the processing circuitry is configured to cause the transmitter to transmit the information indicating that no object is in the area surrounding said another construction machine to said another construction machine to cancel or stop a false alarm in said another construction machine or to cancel or stop restricting a motion of the said another construction machine, when said another construction machine falsely detects the object in the area surrounding said another construction machine.

12. A support system comprising:
a plurality of construction machines including the construction machine as set forth in claim 1, the plurality of construction machines being positioned in the work area.

13. The support system as claimed in claim 12, further comprising:
a storage configured to store information on a monitoring target outside a monitoring area of the construction machine.

14. The support system as claimed in claim 13, wherein the information on the monitoring target stored in the storage is information on the monitoring target in a monitoring area of said another construction machine.

* * * * *